J. F. DOCK.
CLEARING ATTACHMENT FOR PLOWS.

No. 189,087. Patented April 3, 1877.

WITNESSES:
A. W. Almquist
J. H. Scarborough

INVENTOR:
J. F. Dock,
BY
ATTORNEYS.

N. PETERS, PHOTO-LITHOGRAPHER, WASHINGTON, D. C.

UNITED STATES PATENT OFFICE.

JONATHAN F. DOCK, OF ELKHART, INDIANA.

IMPROVEMENT IN CLEARING ATTACHMENTS FOR PLOWS.

Specification forming part of Letters Patent No. 189,087, dated April 3, 1877; application filed March 3, 1877.

*To all whom it may concern:*

Figure 1:
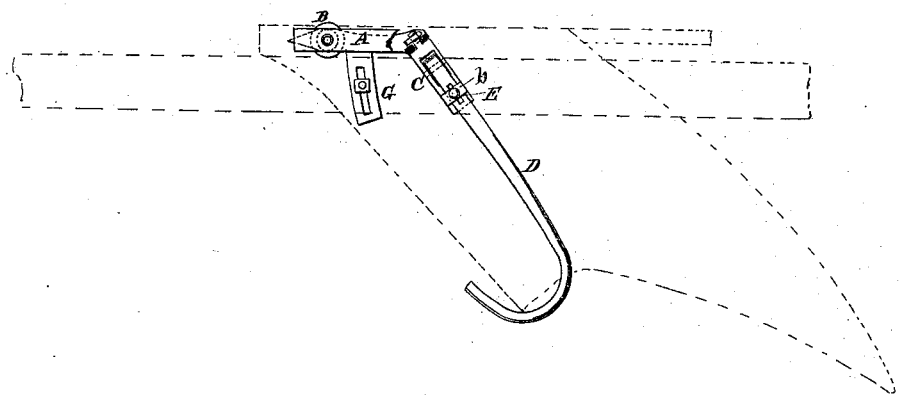
Figure 2:
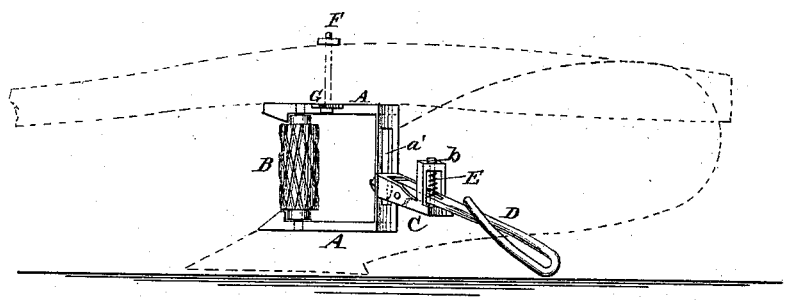

Be it known that I, JONATHAN F. DOCK, of Elkhart, in the county of Elkhart and State of Indiana, have invented a new and Improved Clearing Attachment for Plows, of which the following is a specification:

In the accompanying drawing, Figure 1 is a plan view, showing a position of a plow, in dotted lines, having my improvement attached. Fig. 2 is a side elevation of the same.

Similar letters of reference indicate corresponding parts.

My invention consists of a frame bolted to the plow-beam, and carrying a serrated roller, that revolves on a vertical axis above the upper edge of the plowshare, and a jointed hook, that projects diagonally from the said frame, for drawing stubble, weeds, &c., into the furrow as it is turned.

In the drawing, A is a frame, in which is journaled a serrated roller, B. A support, C, to which a hook, D, is hinged, is secured to the frame A by a bolt that passes through the slot $a'$. The hook D projects downward and rearward from the frame A, and is forced downward by a spring, E, that is confined by a yoke, $b$, formed on the support C.

The frame A is secured to the plow-beam by a bolt, F, that passes through the slotted arm G, projecting from the frame A. The advancing end of the lower portion of the frame A is pointed, so that it may readily pass through stubble and weeds. The roller B is grooved spirally in opposite directions, forming diamond-shaped projections, which engage with the surface of the earth as it is turned up by the plowshare, and insures its rotation. This roller assists in turning the furrow, and also rolls the weeds under.

The hook D is drawn along upon the surface of the ground, and draws in the stubble and weeds as the furrow is turned. The spring E permits it to follow the inequalities of the ground.

Having thus described my invention, I claim as new and desire to secure by Letters Patent—

The combination of the frame A, roller B, support C, hook D, and spring E, substantially as herein shown and described.

JONATHAN F. DOCK.

Witnesses:
WILLIAM J. FISHER,
J. D. DEVOR.